United States Patent
Rauner et al.

(10) Patent No.: US 8,825,245 B2
(45) Date of Patent: Sep. 2, 2014

(54) METHOD FOR OPERATING A FUEL EVAPORATION RETENTION SYSTEM

(75) Inventors: Thomas Rauner, Blaubeuren (DE); Josef Oesterle, Muehlacker (DE); Andreas Menke, Weingarten (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 407 days.

(21) Appl. No.: 12/831,295

(22) Filed: Jul. 7, 2010

(65) Prior Publication Data
US 2011/0029176 A1 Feb. 3, 2011

(30) Foreign Application Priority Data
Jul. 31, 2009 (DE) .................... 10 2009 035 845

(51) Int. Cl.
*F02D 41/00* (2006.01)
*B60W 20/00* (2006.01)

(52) U.S. Cl.
USPC ........................................... 701/22; 701/102

(58) Field of Classification Search
USPC ............................................................ 701/22
See application file for complete search history.

(56) References Cited

U.S. PATENT DOCUMENTS

| | | | |
|---|---|---|---|
| 5,921,222 A | 7/1999 | Freeland | |
| 5,962,927 A | 10/1999 | Inada et al. | |
| 6,079,397 A | 6/2000 | Matsumoto et al. | |
| 6,557,534 B2 | 5/2003 | Robichaux et al. | |
| 6,679,214 B2 * | 1/2004 | Kobayashi et al. | 123/179.4 |
| 6,808,621 B1 * | 10/2004 | Cisneros | 208/133 |
| 6,994,075 B2 | 2/2006 | Penschuck | |
| 2011/0100210 A1 * | 5/2011 | Streib et al. | 95/11 |

FOREIGN PATENT DOCUMENTS

| | | |
|---|---|---|
| DE | 199 35 886 | 2/2000 |
| DE | 200 19 968 | 3/2001 |
| DE | 102 52 225 | 5/2004 |
| DE | 698 23 754 | 10/2004 |
| JP | 09-184436 | 7/1997 |
| JP | 2005-23881 | 1/2005 |
| JP | 2007-210536 | 8/2007 |

* cited by examiner

*Primary Examiner* — Hiep V Nguyen
(74) *Attorney, Agent, or Firm* — Gerald E. Hespos; Michael J. Porco; Matthew T. Hespos

(57) ABSTRACT

A method is provided to prevent an undesirable flooding or breaching of an activated charcoal filter during the operation of a hybrid vehicle or of a motor vehicle with automatic start/stop. The method includes monitoring during the operation of the vehicle at least one factor that has an effect on the fuel evaporation and using the monitored factor to prevent an undesirable flooding or breaching of the activated charcoal filter.

13 Claims, 1 Drawing Sheet

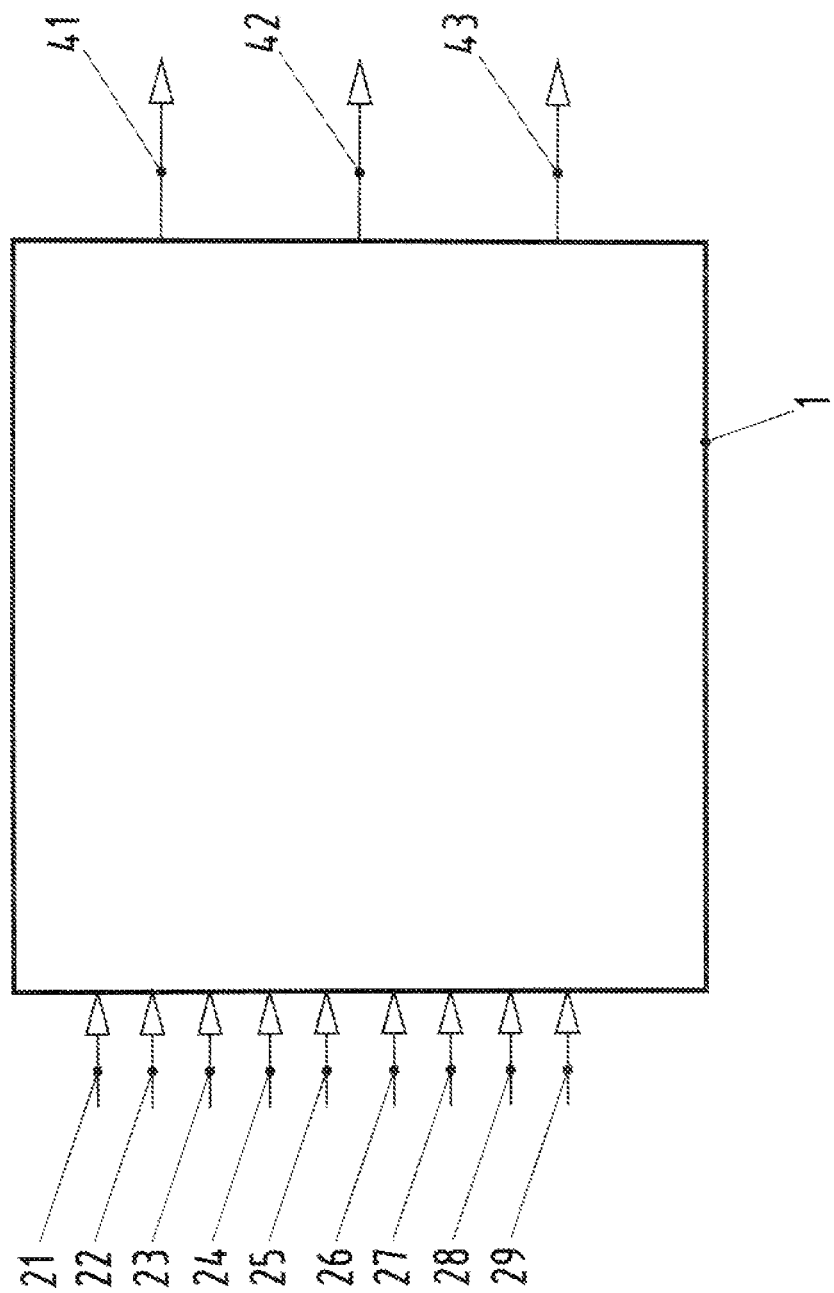

METHOD FOR OPERATING A FUEL EVAPORATION RETENTION SYSTEM

CROSS REFERENCE TO RELATED APPLICATIONS

This application claims priority under 35 USC 119 to German Patent Application No. 10 2009 035 845.5 filed on Jul. 31, 2009, the entire disclosure of which is incorporated herein by reference.

BACKGROUND OF THE INVENTION

1. Field of the Invention

The invention relates to a method for operating a fuel evaporation retention system in a hybrid vehicle or in a motor vehicle with automatic start/stop, with a fuel tank and with an activated charcoal filter container equipped with an activated charcoal filter and with a tank venting valve that is activated by means of a control apparatus so that the activated charcoal filter container is scavenged while the motor vehicle is in operation.

2. Description of the Related Art

U.S. Pat. No. 6,679,214 B2, U.S. Pat. No. 6,557,534 B2, JP 09184436 A, JP 2007210536 A and JP 2005023881 A disclose various measures for controlling fuel evaporation in the fuel tank of motor vehicles. For example, U.S. Pat. No. 6,679,214 B2 proposes holding the internal pressure in the fuel tank at a preselected pressure level while the internal combustion engine is being operated. A stopping of the internal combustion engine is to be prohibited when the internal fuel tank pressure overshoots the preselected pressure level. U.S. Pat. No. 6,557,534 B2 determines the pressure in the fuel tank of a vehicle that has a hybrid drive and compares the pressure with a balanceable pressure stage. The comparative values are used for regulating a throttle valve plate.

The object of the invention is to prevent an undesirable flooding or breaching of the activated charcoal filter during the operation of a hybrid vehicle or of a motor vehicle with automatic start/stop.

SUMMARY OF THE INVENTION

The invention relates to a method for operating a fuel evaporation retention system in a hybrid vehicle or in a motor vehicle with automatic start/stop. The vehicle has a fuel tank, an activated charcoal filter container equipped with an activated charcoal filter and a tank venting valve that is activated by means of a control apparatus so that the activated charcoal filter container is scavenged while the motor vehicle is in operation. Factors that have an effect on the fuel evaporation are monitored during the operation of the vehicle and are used so that an undesirable flooding or breaching of the activated charcoal filter is prevented. The activated charcoal filter functions to avoid the occurrence of fuel vapors from the fuel system, absorbs the fuel vapors and is thereby laden with hydrocarbons. The hydrocarbons stored in the activated charcoal filter are from time to time supplied to the internal combustion engine of the vehicle and burnt. The internal combustion engine is only temporarily in operation in a hybrid vehicle or in a vehicle with automatic start/stop. Hence, there only temporarily are times where there is the possibility of burning the hydrocarbons stored in the activated charcoal filter and the risk arises that the activated charcoal filter is flooded or breached. Flooding or breach of the activated charcoal filter may lead to a considerable degree of unpleasant odors and/or to pollution of the environment. Various measures are proposed within the scope of the present invention to prevent a flooding or breaching of the activated charcoal filter, in that, for example, the loading of the activated charcoal filter with hydrocarbons is measured directly. The changes proposed within the scope of this invention disclosure may be employed individually or in any desired combinations to prevent a flooding of breaching of the activated charcoal filter. Depending on the loading of the activated charcoal filter with hydrocarbons, which is either measured directly or detected by means of corresponding sensors or by means of at least one of the measures disclosed herein, a priority shift to an overriding scavenging of the activated charcoal filter or increasing the scavenging duration is provided. Alternatively or additionally, a shift of the load point may be carried out on the internal combustion engine to increase the scavenging mass flow by enhancing the differential pressure at the activated charcoal filter. Furthermore, a stop prohibition may be provided for the internal combustion engine.

The method may include monitoring the filling level of the activated charcoal filter container is monitored. For this purpose, for example, one or more temperature measurement points may be provided on the activated charcoal filter. Alternatively or additionally, measurement values of various sensors already present in the vehicle may be taken into account.

The method may include detecting the temperature at various points of the activated charcoal filter container to monitor the filling level of the activated charcoal filter container. The measurement points for the temperature preferably are provided directly on the activated charcoal filter.

The method may further include monitoring the hydrogen/carbon molecule concentration in the scavenging stream of the activated charcoal filter container. If the hydrogen/carbon molecule concentration, which is also designated as the hydrocarbon concentration, is very high, it may be assumed that the activated charcoal filter is heavily filled. When the activated charcoal filter is laden to breaching point, the scavenging stream will also acquire the maximum possible quantity of hydrocarbon molecules, that is to say will be saturated. The detection of this saturation preferably takes place in the engine control.

The method is characterized in that the outside temperature is monitored to prevent an undesirable flooding or breaching of the activated charcoal filter. The outside temperature plays a critical part in the evaporation of the fuel. If the outside temperature is high, this leads to a heating of the entire vehicle and of the fuel tank. Markedly more fuel therefore evaporates. This leads to a faster loading of the activated charcoal filter. A conventional temperature sensor on the vehicle may be used for detecting the outside temperature.

The method may include monitoring height, elevation or altitude differences overcome by the vehicle while it is driving. The detected values are used to prevent an undesirable flooding or breaching of the activated charcoal filter. For example, a vehicle travelling on hills overcomes very large height, elevation altitude differences in very short time segments. Height integral calculation can be carried out to analyze the height covered. In this case, the area of the height, elevation or altitude covered above sea level over time is considered. If the value considered is very high, it may be assumed that the vehicle has overcome large height differences in a long time or is on its way constantly at a great height. If it gains height rapidly or keeps to a constant height, this leads to a greater evaporation of the fuel and therefore to a risk of rapid breaching of the activated charcoal filter.

The method may further include monitoring the quality of the fuel in the fuel tank to prevent an undesirable flooding or breaching of the activated charcoal filter. The fuel in the fuel tank evaporates to a great extent or to a lesser extent depending on how many easily volatile fuel components are present. This fuel quality, which can be detected by means of the vapor pressure according to Reid, may be different, depending on the country in which the vehicle is travelling.

Devices for fuel detection may be integrated into a motor vehicle. For fuel detection, for example, adaptive methods may be used to detect unsteady running when the internal combustion is in operation. Alternatively or additionally, the exhaust gas lambda, as it is known, may be used to detect fuel quality. A highly evaporating fuel leads to a faster filling of the activated charcoal filter and therefore also leads, after a shorter time, to a breach.

The method may include monitoring a dynamic factor and using the monitored dynamic factor to prevent an undesirable flooding or breaching of the activated charcoal filter. A dynamic factor is understood to mean an analysis of the driving style of the driver. In the event of rapid cornering, the fuel sloshes in the tank to a great extent. As a result, the evaporation in the tank rises and the activated charcoal filter is filled more quickly. The integral of the power demanded can be formed to detect the dynamic factor. In addition, the transverse acceleration, for example from the ESP control apparatus, may be used. If the integral has a high value, a correspondingly large amount of power has been demanded, and therefore a sporty type of driving is to be assumed.

The method may include monitoring the rate of change in the filling level of the fuel tank to detect an action of refuelling the fuel tank. Cool filling station fuel typically meets warm residual fuel in the tank during a vehicle refuelling, thus leading to a high evaporation of hydrocarbon molecules. At the same time, the internal combustion engine is stopped and hence the activated charcoal filter is not scavenged during refuelling.

The method may further include monitoring the temperature in the fuel tank. The tank temperature, like the outside temperature, is also critical for the rate of evaporation of the fuel. Evaporation of the fuel is greater when the tank temperature is higher.

The method also may include monitoring the pressure in the fuel tank. Evidence of the evaporation of the fuel can be obtained by means of the tank pressure. In the case of a low pressure inside the tank, the evaporation temperature of the fuel falls markedly. Conversely, in the case of a rise of pressure in the tank, the evaporation temperature rises. The pressure in the tank falls and the concentration of hydrocarbon molecules in the tank and in the activated charcoal filter increases if the vehicle gains height quickly, such as when the vehicle is travelling on a hill.

Stopping or electric driving may be prohibited when the monitoring of vehicle operation indicates that a flooding or breaching of the activated charcoal filter is imminent. During stopping or electric driving, the activated charcoal filter could continue to be filled and a breach would be unavoidable.

The method may prohibit a switch-off of the internal combustion engine when the monitoring of vehicle operation indicates that a flooding or breaching of the activated charcoal filter is imminent. The activated charcoal filter cannot be scavenged in the phases when the vehicle is driven electrically or when the internal combustion engine is stopped due to the automatic start/stop facility. Suitable sensors and measuring devices can cooperate with appropriate systems engineering to prohibit the switch-off of the internal combustion engine in the event of a critical filling level of the activated charcoal filter.

The method may be characterized in that the activated charcoal filter or the activated charcoal filter container is scavenged when the monitoring of vehicle operation indicates that a flooding or breaching of the activated charcoal filter is imminent. The scavenging may be performed until the activated charcoal filter has reached an "uncritical" filling level.

Further advantages, features and details will be gathered from the following description in which various exemplary embodiments are described in detail with reference to the drawing.

BRIEF DESCRIPTION OF THE DRAWING

The FIGURE is a greatly simplified illustration of an automatic control system with the aid of which an undesirable flooding or breaching of an activated charcoal filter during the operation of a hybrid vehicle or of a motor vehicle with automatic start/stop can be prevented.

DETAILED DESCRIPTION OF THE PREFERRED EMBODIMENT

The activated charcoal filter is required to absorb the fuel gases occurring during the operation of a motor vehicle and to prevent these fuel gases from passing into the environment. However, the storage capacity of the activated charcoal filter is limited by its volume, and a saturation limit may be overshot if there is insufficient scavenging with fresh air. To prevent this, a sufficient scavenging or scavenging quantity must be ensured.

Possible causes of too low a scavenging of the activated charcoal filter are, for example, electric driving or a stop phase. More particularly, the internal combustion engine is switched off during electric driving and during a stop phase, and hence no fuel vapor is taken off from the engine. The scavenging quantity of the activated charcoal filter is dependent on the pressure difference between the fresh-air supply line of the activated charcoal filter and the pressure prevailing at the point of introduction on the internal combustion engine, that is to say between the ambient pressure and the suction-pipe pressure.

A correspondingly low scavenging mass flow occurs in the case of frequent driving at operating points with a low pressure difference. The filling level of the activated charcoal filter container or of the activated charcoal filter must be determined and must be influenced by appropriate measures to prevent a flooding of the activated charcoal filter.

The present invention employs at least one strategy in hybrid vehicles or in vehicles with automatic start/stop to prevent an undesirable escape of fuel vapors from the fuel system. Hybrid vehicles and vehicles with automatic start/stop have as short a switch-on duration of the internal combustion engine as possible during a driving cycle to reduce the fuel consumption. There is therefore less time available to supply the hydrocarbons, which are stored in an activated charcoal filter container or activated charcoal filter and emerge from the tank system in the form of gas, to the internal combustion engine and burn them. Depending on the operating conditions, the activated charcoal filter may be filled continuously and may reach saturation. As a result, fuel vapor can no longer be absorbed and passes into the environment via a flood line. This is called a breaching or flooding of the activated charcoal filter.

Various factors have effects on the generation of fuel vapor and symptoms that make detection possible have been considered. Methods are indicated for detecting or predicting a breaching of the activated charcoal filter so that breaching can be prevented by appropriate measures.

The rectangle identified by the numeral 1 in FIG. 1 is an automatic control system for preventing a breaching of the activated charcoal filter. Arrows 21 to 29 indicate relevant influencing variables upon the generation of fuel vapor and the filling of the activated charcoal filter or of the activated charcoal filter container. Possible counter reactions are indicated by further arrows 41 to 43.

The arrow 21 indicates a variation in the tank filling level for detecting a refuelling action. The arrow 22 indicates a saturation of the tank venting scavenging stream. The arrow 23 indicates the outside temperature. The arrow 24 indicates the height or altitude at which the motor vehicle is located or the height integral formed from this. The arrow 25 indicates a fuel quality detection, for example via a start adaptation. The arrow 26 indicates the integrated engine power. The arrow 27 indicates the filling level of the activated charcoal filter. The arrow 28 indicates the tank temperature. The arrow 29 indicates the tank pressure.

The arrow 41 indicates a priority shift toward an overriding scavenging of the activated charcoal filter and, consequently, an increase in the scavenging duration of the activated charcoal filter. The arrow 42 indicates a shift in the load point to increase the scavenging mass flow by enhancing the differential pressure at the activated charcoal filter, the electric machine of the hybrid vehicle exerting an assisting action. The arrow 43 indicates a stop prohibition for the internal combustion engine to increase the scavenging duration of the activated charcoal filter.

What is claimed is:

1. A method for operating a fuel evaporation retention system in a hybrid vehicle or in a motor vehicle with automatic start/stop, the vehicle having a fuel tank, an activated charcoal filter container equipped with an activated charcoal filter and a tank venting valve activated by a control apparatus so that the activated charcoal filter container is scavenged while the motor vehicle is in operation, the method comprising:

monitoring at least one factor indicative of a filling level of the activated charcoal filter container;
    monitoring factors that have an effect on fuel evaporation during operation of the vehicle, the monitored factors that have an effect on fuel evaporation during operation including at least one dynamic factor selected from the group consisting of:
    an integral of power demanded, and
    transverse acceleration; and
    at least one additional factor selected from the group consisting of:
    altitude differences overcome by the vehicle during driving;
    fuel quality in the fuel tank; and
    using the monitored factors to prevent an undesirable flooding or breaching of the activated charcoal filter.

2. The method of claim 1, wherein the step of monitoring at least one factor indicative of a filling level of the activated charcoal filter container comprises detecting temperature at various points of the activated charcoal filter container.

3. The method of claim 1, wherein the step of monitoring at least one factor indicative of a filling level of the activated charcoal filter container comprises monitoring hydrogen/carbon molecule concentration in a scavenging stream of the activated charcoal filter container.

4. The method of claim 1, wherein the step of monitoring at least one factor that has an effect on fuel evaporation during operation of the vehicle further comprises monitoring outside temperature to prevent an undesirable flooding or breaching of the activated charcoal filter.

5. The method of claim 1, wherein the step of monitoring at least one factor that has an effect on fuel evaporation during operation of the vehicle further comprises monitoring a rate of change in a filling level of the fuel tank to detect an action of refueling the fuel tank.

6. The method of claim 1, wherein the step of monitoring at least one factor that has an effect on fuel evaporation during operation of the vehicle further comprises monitoring a temperature in the fuel tank.

7. The method of claim 1, wherein the step of monitoring at least one factor that has an effect on fuel evaporation during operation of the vehicle further comprises monitoring pressure in the fuel tank.

8. The method of claim 1, wherein the step of using the monitored factors to prevent an undesirable flooding or breaching of the activated charcoal filter comprises prohibiting stopping or electric driving when the monitoring indicates that a flooding or breaching of the activated charcoal filter is imminent.

9. The method of claim 1, wherein the step of using the monitored factors to prevent an undesirable flooding or breaching of the activated charcoal filter comprises prohibiting a switch-off of an internal combustion engine of the vehicle when the monitoring indicates that a flooding or breaching of the activated charcoal filter is imminent.

10. The method of claim 1, wherein the step of using the monitored factors to prevent an undesirable flooding or breaching of the activated charcoal filter comprises scavenging the activated charcoal filter or the activated charcoal filter container when the monitoring indicates that a flooding or breaching of the activated charcoal filter is imminent.

11. A motor vehicle comprising:
    an internal combustion engine;
    a fuel tank communicating with the internal combustion engine;
    an activated charcoal filter container communicating with the fuel tank and with the internal combustion engine, the activated charcoal filter container being equipped with an activated charcoal filter;
    a tank venting valve communicating with the internal combustion engine and the activated charcoal filter container for enabling scavenging of the activated charcoal filter while the internal combustion engine is in operation; and
    a control means for monitoring factors that have an effect on a need to scavenge the activated charcoal filter to prevent an undesirable flooding or breaching of the activated charcoal filter and for controlling operation of the internal combustion engine when the monitored factors indicate a need to scavenge the activated charcoal filter, the monitored factors comprising at least one dynamic factor selected from the group consisting of: an integral of power demanded, and transverse acceleration; and at least one additional factors selected from: outside temperature, altitude differences overcome by the vehicle during driving, fuel quality in the fuel tank, a rate of change in a filling level of the fuel tank and a temperature in the fuel tank.

12. The motor vehicle of claim 11, wherein the control means for monitoring at least one factor that has an effect on a need to scavenge the activated charcoal filter to prevent an undesirable flooding or breaching of the activated charcoal filter further includes means for monitoring a filling level of the activated charcoal filter container.

13. The motor vehicle of claim 11, wherein the means for controlling operation of the internal combustion engine when the at least one monitored factor indicates a need to scavenge the activated charcoal filter includes at least one of a means for prohibiting a switch-off of an internal combustion engine and means for prohibiting an electric driving of the motor vehicle.

\* \* \* \* \*